Patented Oct. 8, 1935

2,016,282

UNITED STATES PATENT OFFICE 2,016,282

DISTILLATION OF MARKING NUT SHELL LIQUID AND PRODUCTS THEREFROM

Mortimer T. Harvey, East Orange, N. J., assignor to The Harvel Corporation, a corporation of New Jersey No Drawing. Application March 17, 1931, Serial No. 523,383

6 Claims. (Cl. 260—154)

The present invention relates, generally, to products obtained by fractionally distilling the shell liquid of the marking nut, which latter is also known as Semecarpus anacardium and *Anacardium orientale*. The invention relates more particularly to phenolic compounds, organic acids, pitches, terpenes and other compounds obtained by the fractional distillation of the shell liquid of the marking nut and is useful generally and more particularly as pointed out hereinbelow. The invention also relates to methods and steps for making and using the products of the invention.

The shell liquid of the marking nut, according to this invention, is distilled either after it has been extracted from the shell, or by distilling the shells after removal from the kernel, or by distilling the whole nut including shell and kernel, or by pressing out all the juices of the nut including the shell liquid and kernel oil and distilling that mixture.

In the use of any of these methods the distillation is carried on until the final residue is reached, the distillation temperature reaching to the temperatures at which the desired products are obtained. This temperature range commences at about 250° F. and will go above 700 to 750° F. in some cases. The distillate on standing separates into two layers comprising a water layer generally having acetic acid in solution and an oily layer which generally includes terpenes, unsaturated straight chain and ring compounds, organic acids, and phenols, which latter are of the high molecule type. The phenols and organic acids can be separated from the rest of the oily layer by removal with caustic solution and later separated from the caustic solution by neutralizing with an acid such as hydrochloric acid. That part of the oily layer from which the phenols and acids have been removed with caustic contains terpenes and unsaturated straight chain and ring compounds. The phenols and the organic acids can be separated from each other by fractional distillation, the acids being generally of higher boiling point. Vacuum and steam distillation are suitable for the final separations.

The residue of the first distillation of the marking nut shell liquid is either a pitch-like compound or a carbonaceous material, depending upon the degree to which distillation is carried on, that is with continued high temperatures the residue can be reduced to a carbon.

Acetic acid can be removed and recovered from the water solution and also certain pyro-organic compounds which also are present.

The terpenes and unsaturated compounds can be used as solvents for paints, varnishes and lacquers; can be used as insecticides; and can be used for giving odors to chemical mixtures because they have characteristic odors of their own. They also can be used for perfume bases, perfumes being made from them as through oxidation, for example with dilute nitric acid; hydrogenation; or sulphonation.

The phenols are useful generally and are particularly useful for pharmaceutical and medicinal purposes. They have comparatively high phenol coefficient and for that reason are particularly useful as and in germicides, antiseptics and so on, for mouth washes, dressing wounds, and for other hygienic uses. Resinous products can also be made from these phenols by reaction with aldehydes, for example paraformaldehyde, formaldehyde, furfuraldehyde and so on, with or without the use of catalysts such as acids, alkalies and other compounds.

The organic acids separated from the phenols after being sulphonated, as by means of sulphuric acid with subsequent neutralization with lime, give a water solution which is useful in tanning and curing of hides and the like, and also for reaction with glue and gelatin. In the latter case reaction with glue or gelatin gives a plastic adhesive compound which can be softened by but is insoluble in water and from which the characteristic odor of the glue, when the latter is used, is absent. Further reaction can be made with formaldehyde to give a resinous product which is insoluble and infusible.

The residues which are above referred to are of an intense black color and are suitable for use in varnishes, japans and lacquers in which they give an intense glossy black finish. The carbons, when those are produced, are suitable to the common uses of carbon blacks.

The first distillation of the marking nut shell liquid can be preceded by heating under pressures greater than normal to aid in the cracking of the said liquid, after which distillation subsequent treatments and separations can be carried on in the manner above indicated to separate the various constituents. Also, phenolic and other compounds can be obtained from the marking nut shell liquid by distillation under reduced pressures.

As a particular example of the distillation of marking nut shell liquid under normal pressures the following is given. A quantity of marking nuts, 75 parts by weight, were placed in a metal container, which latter was connected to a water cooled condenser, and heat applied under the container. At about 180° F. vapors were driven off and at about 320° F. the first drops of liquid started to flow. Distillation was carried on to dryness at a temperature of about 750° F. From this quantity of material about 33 parts by weight were obtained in the distillate, about 28 parts were in the residue, and about 13 parts were lost in vapors.

The distillate is herein identified for further clearness as distillate (I), and the residue as residue (II). The distillate (I) was left to stand in a separatory funnel where an oil layer (III)

and a water layer (IV) divided out, in substantially equal parts. The water layer (IV) contains acetic acid in solution together with some pyro-organic acid compounds, which latter can be separated by evaporation of the water and acetic acid, this last being condensed to save that.

A quantity of the oil layer (III) was shaken up with an equal volume of a 10% solution of caustic soda in water and left to stand in a separatory funnel. On standing it was found that a part of said oil layer (III) has reacted with or gone into solution in the caustic soda leaving an insoluble layer (V) of about 12½ volumes floating on the caustic solution (VI) which was about 37½ volumes. An examination of said insoluble layer (V) indicated that it contained terpenes and unsaturated straight chain and ring compounds. An examination of the caustic solution (VI) indicated that that contained organic acids and phenols or the sodium compounds of them.

A disinfectant soap solution was made up from said caustic solution (VI) by taking six parts of the latter and adding thereto about one part of water white rosin to neutralize excess caustic and about one part of a 15% soap solution. This gave a phenol coefficient of 0.65 by the Rideal-Walker method (1921 modification). This mixture is useful as a disinfectant in water for washing floors, woodwork, and so on.

The Rideal-Walker method (1921 modification) of germicidal test uses *B. typhosus* (Hopkins) as the organism and Rideal-Walker beef extract broth as the medium, with the temperature of medication at 18° C. The dose comprises 0.5 c. c. of filter culture to 5 c. c. of the diluted disinfectant. Each subculture is a 4 mm. loopful to 10 c. c. of broth which is incubated at 37° C. for 48 hours. These specifications were used in the disinfectant tests described in the above paragraph and gave the following results:

| Sample | Dilution | Minutes of exposure to disinfectant | | | | | |
|---|---|---|---|---|---|---|---|
| | | 2½ | 5 | 7½ | 10 | 12½ | 15 |
| Solution of the above paragraph | 1:10 | − | − | − | − | − | − |
| | 1:20 | − | − | − | − | − | − |
| | 1:30 | + | − | − | − | − | − |
| | 1:50 | + | − | − | − | − | − |
| | 1:75 | + | + | + | − | − | − |
| | 1:100 | + | + | + | + | + | + |
| Phenol | 1:90 | + | + | − | − | − | − |
| | 1:100 | + | + | + | − | − | − |

Phenol coefficient $\frac{50}{90} \frac{75}{100} = .065$

Germicides for mouth washes and similar uses, as above noted, can be made from the phenols of caustic solution (VI) by neutralizing the caustic to free the phenols, letting it stand until the phenols separate out, removing the phenols and taking them up with water or alcohol, or both, for example, a 25% solution of alcohol in water.

In the practice of this invention, generally, alcohols and ester which may be formed can be separated out by solution in different strength solutions of ethyl alcohol and by other steps commonly used.

It is to be noted also that the compounds distilled on either side of the phenols as obtained from said caustic solution (VI) and also some of the pitches of residue (II) will react with aldehydes, in the manner above indicated, to produce condensation products.

It is to be understood that in the distillation of the marking nut shell liquid no particular limit as to temperature is set because, as above noted, the distillation can be carried out to complete carbonization of the residue (II).

Having thus described my invention what I claim is—

1. Phenolic compounds obtained by the distillation of marking nut shell liquid above a temperature of 250° F.

2. A distillate product obtained by distilling marking nut shell liquid at a temperature above 250° F., which distillate product is soluble in alkaline solutions.

3. The pitch-like residual products suitable for use in paints, varnishes and lacquers and obtained by distilling marking nut shell liquid up to a temperature of about 750° F.

4. The method which comprises distilling marking nut shell liquid above a temperature of 250° F.

5. The method which comprises distilling marking nut shell liquid at a temperature above 250° F. and the removing of phenolic compounds from the distillate.

6. A distillate from marking nut shell liquid obtainable at a temperature above 250° F., which distillate is phenolic and is reactive with aldehydes to form a resin.

MORTIMER T. HARVEY.